C. Germann,
Saw.
Nº 29,688. Patented Aug 21, 1860.

Witnesses
J W Coombs
R S Spencer

Inventor
Christian Germann
per Munn & Co
Attorneys

UNITED STATES PATENT OFFICE.

CHRISTIAN GERMANN, OF CAMDEN, MICHIGAN.

RECIPROCATING SAW.

Specification of Letters Patent No. 29,688, dated August 21, 1860.

*To all whom it may concern:*

Be it known that I, C. GERMANN, of Camden, in the county of Hillsdale and State of Michigan, have invented a new and useful Improvement in Saws; and I do hereby declare that the following is a full, clear, and exact description thereof, reference being had to the accompanying drawings, making part of this specification, in which—

Figure 1:
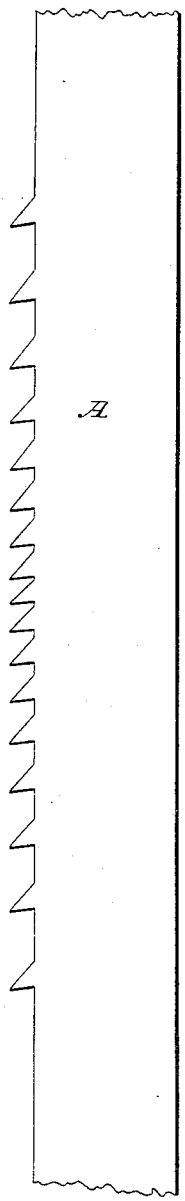
Figure 2:
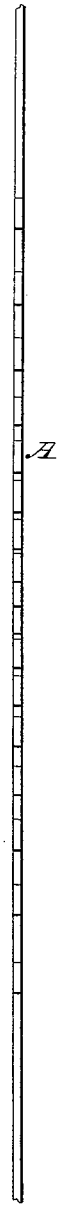

Figure 1 is a face view of a straight narrow blade saw. Fig. 2 is an edge view of the same.

This invention is an improvement in rectilinear saws, the object of which improvement is to prevent the saw from wearing away more rapidly in the center than at or near the ends, thereby saving a great deal of filing and jointing. It consists in varying the pitch of the teeth in the same blade and gradually diminishing their obtuseness, and also diminishing their distance apart as they approach the middle of the saw blade, as will be hereinafter described and represented.

My invention is applicable to all varieties of rectilinear saws but not to circular saws. The forms of teeth may vary with the kind of stuff the saw is especially adapted to cut but the ordinary pitch or hand saw tooth will be preferable.

A is the blade which may be made of any desired thickness and width, from a buck saw to a pit saw blade. These saw teeth are all cut of a uniform length, with the pitch of each tooth, running in the same direction. In this improvement the teeth are not cut equi-distant, but they gradually increase in distance apart from the middle of the blade to the ends. The pitch of the teeth, or their obtuseness gradually diminishes from the ends to the middle of the blade, that is to say, each tooth as it approaches the middle of the blade is more acute,—though they are all of the same length,—than the one succeeding it. The teeth being thus fewer at and near the ends where they have the least amount of work to perform, the wear of the edges of the teeth will be more uniformly distributed over the blade and consequently when the saw is filed the teeth near the middle of the blade will require about as much filing as those at and near the ends of the blade, and to guard against the wearing away of the teeth at and near the ends more than at and near the middle, they are made more acute as they approach the middle of the blade. In this manner the hollowing of the saw may be prevented, or corrected where it already exists, and the points of the teeth may be kept on a straight line.

Having thus described my invention, what I claim as new, and desire to secure by Letters Patent, is—

Varying the pitch of saw teeth, as they approach the middle of the blade, and also diminishing their distance apart as they approach the middle of the blade, as and for the purposes set forth.

CHRISTIAN GERMANN.

Witnesses:
   ALFAYETTE DAY,
   GEORGE B. PHELPS.